United States Patent
Sakai (10) Patent No.: US 11,524,550 B2
(45) Date of Patent: Dec. 13, 2022

(54) AIR CONDITIONING CONTROL DEVICE

(71) Applicant: DENSO CORPORATION, Kariya (JP)

(72) Inventor: Koji Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 583 days.

(21) Appl. No.: 16/590,563

(22) Filed: Oct. 2, 2019

(65) Prior Publication Data

US 2020/0039321 A1 Feb. 6, 2020

Related U.S. Application Data

(63) Continuation of application No. PCT/JP2018/026432, filed on Jul. 13, 2018.

(30) Foreign Application Priority Data

Jul. 14, 2017 (JP) .............................. JP2017-137792

(51) Int. Cl.
| | |
|---|---|
| *B60H 1/00* | (2006.01) |
| *F24F 11/30* | (2018.01) |
| *B60W 40/02* | (2006.01) |
| *G05D 1/02* | (2020.01) |
| *F24F 130/20* | (2018.01) |

(52) U.S. Cl.
CPC ..... *B60H 1/00771* (2013.01); *B60H 1/00778* (2013.01); *B60W 40/02* (2013.01); *F24F 11/30* (2018.01); *G05D 1/021* (2013.01); *F24F 2130/20* (2018.01)

(58) Field of Classification Search
CPC ............ B60H 1/00771; B60H 1/00778; B60H 1/0075; B60H 1/00764; B60H 1/00742; B60W 40/02; F24F 11/30; F24F 2130/20; G05D 1/021
See application file for complete search history.

(56) References Cited

U.S. PATENT DOCUMENTS

| | | | |
|---|---|---|---|
| 9,682,609 B1* | 6/2017 | Dudar | B60H 1/00764 |
| 2015/0283914 A1* | 10/2015 | Malone | B60J 1/00 701/49 |
| 2019/0009641 A1* | 1/2019 | Jackson | B60H 1/00357 |

FOREIGN PATENT DOCUMENTS

| | | |
|---|---|---|
| JP | 2001063347 A | 3/2001 |
| JP | 2012236487 A | 12/2012 |
| JP | 2015174525 A | 10/2015 |

* cited by examiner

*Primary Examiner* — James M McPherson
*Assistant Examiner* — Kyle J Kingsland
(74) *Attorney, Agent, or Firm* — Harness, Dickey & Pierce, P.L.C.

(57) ABSTRACT

An air conditioning control device includes: a passenger determination unit that determines whether a passenger is in a self-driving vehicle; a travel determination unit that determines a traveling state of the self-driving vehicle; and a light blocking control unit that executes a light blocking air conditioning control for a vehicle cabin by operating a light blocking device to adjust solar radiation into the vehicle cabin from a window of the self-driving vehicle when the passenger determination unit and the travel determination unit determine that the self-driving vehicle is in an unmanned traveling condition.

9 Claims, 6 Drawing Sheets

AIR CONDITIONING CONTROL DEVICE

CROSS REFERENCE TO RELATED APPLICATION

The present application is a continuation application of International Patent Application No. PCT/JP2018/026432 filed on Jul. 13, 2018, which designated the U.S. and claims the benefit of priority from Japanese Patent Application No. 2017-137792 filed on Jul. 14, 2017. The entire disclosures of all of the above applications are incorporated herein by reference.

TECHNICAL FIELD

The present disclosure relates to an air conditioning control device for a self-driving vehicle.

BACKGROUND

An air conditioning control system controls an air conditioner in an electric car to perform pre-conditioning that provides temperature-adjusted air into the vehicle interior by operating the air conditioner when there is no occupant in the vehicle as the passenger gets off for charging the battery.

SUMMARY

According to the present disclosure, an air conditioning control device for a self-driving vehicle includes: a passenger determination unit that determines whether a passenger is in the self-driving vehicle; a travel determination unit that determines a traveling state of the self-driving vehicle; and a light blocking control unit that executes a light blocking air conditioning control for a vehicle cabin by operating a light blocking device to adjust solar radiation into the vehicle cabin from a window of the self-driving vehicle when the passenger determination unit and the travel determination unit determine that the self-driving vehicle is in an unmanned traveling condition.

DESCRIPTION OF EMBODIMENT

To begin with, examples of relevant techniques will be described.

Conventionally, it has been an issue to improve the temperature comfort when a person gets on a vehicle. In order to cope with this issue, an air conditioning control system controls an air conditioner in an electric car to perform pre-conditioning that provides temperature-adjusted air into the vehicle interior by operating the air conditioner when there is no occupant in the vehicle as the passenger gets off for charging the battery. After the battery charging is completed, the pre-conditioning is continued using the battery power. Thus, the air conditioning control system can set an appropriate temperature in the passenger compartment when the passenger gets on the vehicle.

Self-driving vehicles are developed not only for assisting the driver, but for traveling without human. Such self-driving vehicles are expected to be used for unmanned travel, such as passenger pick-up, car sharing, or unmanned tax.

If a pre-conditioning in a conventional vehicle air conditioning control system is applied as it is to a self-driving vehicle, the pre-conditioning is performed during a stop time for the battery charging. In order to pick up an occupant at a position away from the charging location, it is necessary to perform self-driving while continuing air conditioning. As described above, when the air conditioning by the vehicle air conditioner is continued, the electricity or fuel efficiency decreases, and the travel distance decreases.

Solar radiation incident in the vehicle compartment affects the reduction in electricity or fuel efficiency, in such pre-conditioning.

The present disclosure provides an air conditioning control device for a self-driving vehicle, which can suppress reduction in electricity and fuel efficiency caused by solar radiation, and can improve comfortableness when an occupant gets on the vehicle at a position away from a charging location.

According to the present disclosure, an air conditioning control device for a self-driving vehicle includes: a passenger determination unit that determines whether a passenger is in the self-driving vehicle; a travel determination unit that determines a traveling state of the self-driving vehicle; and a light blocking control unit that executes a light blocking air conditioning control for a vehicle cabin by operating a light blocking device to adjust solar radiation into the vehicle cabin from a window of the self-driving vehicle when the passenger determination unit and the travel determination unit determine that the self-driving vehicle is in an unmanned traveling condition.

According to the present disclosure, when it is determined that the vehicle is in the unmanned traveling state, the light blocking air conditioning control is executed for a vehicle interior by operating the light blocking device to adjust solar radiation incident into the vehicle interior. Therefore, it is possible to adjust the temperature in the vehicle cabin more comfortable not only by the vehicle air conditioner using the refrigeration cycle but also by controlling the solar radiation incident into the vehicle cabin. Furthermore, when a person gets on a vehicle in an unmanned state and operates the air conditioning system using the refrigeration cycle, the operation can be started at or close to an appropriate temperature. The load on the air conditioner can be reduced.

Hereinafter, the present embodiment will be described with reference to the attached drawings. For easy understanding, the same reference numeral is attached to the same constituent element in the drawings where possible, and redundant explanations are omitted.

Figure 1:
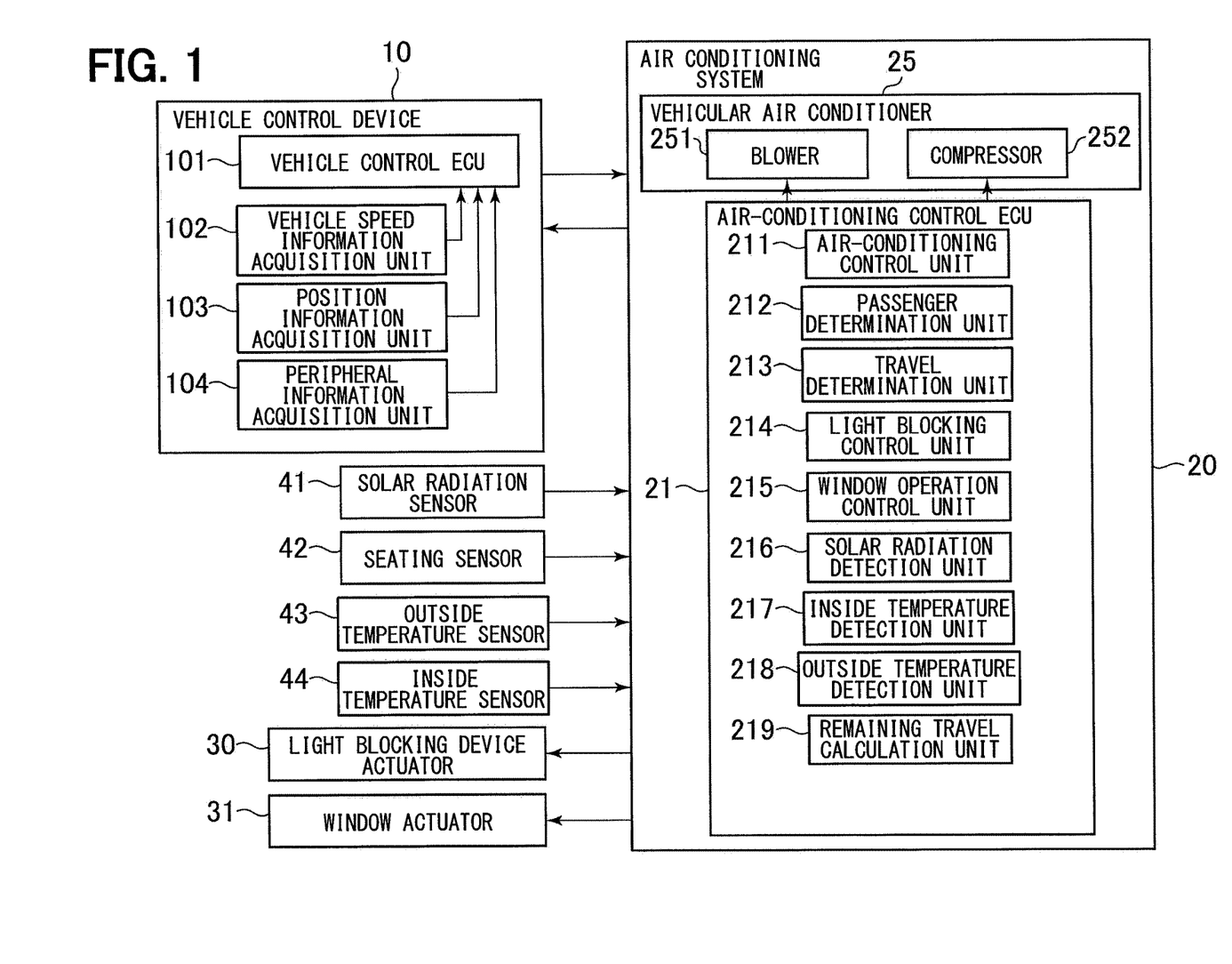
FIG. 1 is a block diagram showing a functional configuration of an air conditioning control ECU according to the present embodiment.

An air conditioning control ECU (Electronic Control Unit) 21 according to the present embodiment will be described with reference to FIG. 1. The air conditioning control ECU 21 is provided in an air conditioning system 20.

The air conditioning system 20 is mounted on a self-driving vehicle (not shown) to perform air conditioning in the vehicle cabin.

The air conditioning system 20 includes the air conditioning control ECU 21 and an air conditioner 25 for a vehicle. The air conditioner 25 includes a blower 251 and a compressor 252. The compressor 252 constitutes a refrigeration cycle included in the air conditioner 25. The blower 251 blows air onto an evaporator and a heater core of the refrigeration cycle to perform cooling or heating. The air conditioner 25 can perform air conditioning inside the vehicle with conditioned air whose temperature has been adjusted by the refrigeration cycle mounted on the self-driving vehicle. The air conditioner 25 can also supply air circulation in the vehicle cabin without driving the refrigeration cycle, to suppress power consumption, by driving only the blower 251.

The air conditioning system 20 is able to communicate with a vehicle control device 10. The vehicle control device 10 includes a vehicle control ECU 101, a vehicle speed information acquisition unit 102, a position information acquisition unit 103, and a peripheral information acquisition unit 104. The vehicle control ECU 101 is mounted on the self-driving vehicle to supervise driving operations such as start, acceleration, deceleration, stop, and steering of the self-driving vehicle.

The vehicle speed information acquisition unit 102 acquires vehicle speed information indicative of or related to the vehicle speed of the self-driving vehicle. The information indicative of the vehicle speed of the self-driving vehicle is vehicle speed data output from a vehicle speed sensor (not shown). The information related to the vehicle speed is position change data output from a navigation system (not shown), and the vehicle speed is specified by the situation in the position change. The vehicle speed information acquisition unit 102 outputs the acquired vehicle speed information to the vehicle control ECU 101. The vehicle control ECU 101 transmits the vehicle speed information to the air conditioning control ECU 21.

The position information acquisition unit 103 acquires position information which specifies a position of the self-driving vehicle based on a GPS signal received by a GPS antenna or a signal indicating the behavior of the vehicle output from a vehicle speed sensor, an acceleration sensor (not shown) or a gyro sensor (not shown). The position information acquisition unit 103 outputs the acquired position information to the vehicle control ECU 101. The vehicle control ECU 101 transmits the position information to the air conditioning control ECU 21.

The peripheral information acquisition unit 104 acquires image data around the self-driving vehicle captured by a camera and target data around the self-driving vehicle acquired by a millimeter wave radar. The peripheral information acquisition unit 104 outputs the acquired image data and target data to the vehicle control ECU 101. The vehicle control ECU 101 transmits the image data and the target data to the air conditioning control ECU 21.

The air conditioning control ECU 21 receives various data output from the solar radiation sensor 41, the seating sensor 42, the outside temperature sensor 43, and the inside temperature sensor 44 in addition to the various data transmitted from the vehicle control ECU 101.

The solar radiation sensor 41 detects the amount of solar radiation into the vehicle cabin from the window of the self-driving vehicle, and outputs the solar radiation amount data to the air conditioning control ECU 21. The windows of the self-driving vehicle can be opened and closed. According to the seat arrangement, there are plural windows such as right and left windows for a front seat, right and left windows for a rear seat, and a rear window. The solar radiation sensor 41 may include, for example, a photodiode. The solar radiation sensor 41 is provided at plural locations in the self-driving vehicle so as to be able to detect a biased solar radiation state where the solar radiation into the vehicle cabin from the window of the self-driving vehicle is biased. As an example, the solar radiation sensor 41 is provided at plural locations of the self-driving vehicle corresponding to each window to detect the biased solar radiation state for each window in the self-driving vehicle. Note that one solar radiation sensor 41 may be provided in each of the front side area and the rear side area of the vehicle cabin.

The seating sensor 42 detects a passenger on the self-driving vehicle, and outputs the passenger data to the air conditioning control ECU 21. Instead of the seating sensor 42, a seat belt sensor may be used, which detects whether or not the seat belt can be worn, to detect the passenger in the self-driving vehicle, or an IR (Infrared) sensor may be used, which detects the temperature of the passenger.

The outside temperature sensor 43 detects the temperature around the outside of the self-driving vehicle, and outputs the outside temperature data to the air conditioning control ECU 21.

The inside temperature sensor 44 detects the temperature in the cabin of the self-driving vehicle, and outputs the inside temperature data to the air conditioning control ECU 21. In the present embodiment, the inside temperature sensor 44 is provided at plural locations of the self-driving vehicle corresponding to the respective seats so as to be able to detect the temperature in the vehicle cabin for each seat of the self-driving vehicle.

The air conditioning control ECU 21 operates the blower 251 and the compressor 252, based on the vehicle speed information, the position information, the peripheral information, the solar radiation amount data, the passenger data, the outside temperature data, and the inside temperature data, and operates the light blocking device actuator 30 and the window actuator 31. The air conditioning control ECU 21 is configured, as a hardware component, by a computer including a computing unit such as a CPU, a storage unit such as a RAM or a ROM, and an interface unit for exchanging data. Subsequently, functional components of the air conditioning control ECU 21 will be described.

As the functional components, the air conditioning control ECU 21 includes an air conditioning control unit 211, a passenger determination unit 212, a travel determination unit 213, a light blocking control unit 214, a window operation control unit 215, a solar radiation detection unit 216, an inside temperature detection unit 217, an outside temperature detection unit 218, and a remaining travel calculation unit 219.

The air conditioning control unit 211 drives the refrigeration cycle including the compressor 252 and the blower 251 to condition air in the self-driving vehicle. The air conditioning control unit 211 controls the vehicular air conditioner 25 capable of performing air conditioning in the vehicle cabin with conditioned air whose temperature has been adjusted by the refrigeration cycle in the self-driving vehicle. The air conditioning control unit 211 executes the air conditioning by operating the refrigeration cycle when a time period for making the temperature in the vehicle cabin of the self-driving vehicle within a proper temperature range using the air conditioner 25 is equal to or shorter than a scheduled travel time. As an example, the air conditioning control unit 211 operates the refrigeration cycle to execute the air conditioning only for a seat where a time period for making the temperature in the vehicle cabin within the proper temperature range using the air conditioner 25 is shorter than or equal to the scheduled travel time.

The passenger determination unit 212 determines the boarding state of the passenger on the self-driving vehicle based on the passenger data. When the passenger data does not indicate that the passenger is on the self-driving vehicle, the passenger determination unit 212 determines that the self-driving vehicle is unmanned. The passenger determination unit 212 may determine whether or not the vehicle interior is unmanned based on whether or not to receive a pick-up request signal remotely transmitted from a terminal such as a smartphone or a personal computer.

The travel determination unit 213 determines the traveling state of the self-driving vehicle based on the vehicle speed information and the position information. When the vehicle speed information indicates a speed equal to or higher than a predetermined threshold speed, the travel determination unit 213 determines that the self-driving vehicle is in a traveling state. Position information can also be used as information related to the vehicle speed. Since the travel determination unit 213 can grasp the position change of the self-driving vehicle with time based on the position information, the position information can be treated as information indicating the speed of the self-driving vehicle. When the position information indicates a position change corresponding to a speed equal to or higher than a predetermined threshold speed, the travel determination unit 213 determines that the self-driving vehicle is in a traveling state.

The light blocking control unit 214 outputs a light blocking operation signal to the light blocking device actuator 30 to instruct open/close of the light blocking device. The light blocking device actuator 30 drives the light blocking device provided in the self-driving vehicle to open or close.

The light blocking device adjusts the solar radiation incident into the vehicle cabin from the window of the self-driving vehicle. The light blocking device may completely shield the solar radiation, or may partially but not completely shield the solar radiation. For example, a sunscreen may be employed as the light blocking device. The light blocking device that not perfectly but partially blocks solar radiation may be a sunscreen having air permeability, or a screen having fine mesh to block light. When the light blocking device having air permeability is used, it is possible to shield the sunlight into the vehicle interior while introducing the wind from the outside into the vehicle interior, when the window of the self-driving vehicle is open. It is to be noted that both of a light blocking device that completely shields solar radiation and a light blocking device that partially but not completely shields solar radiation may be provided. In the present embodiment, one light blocking device is provided corresponding to each window in the self-driving vehicle.

When the determination results of the passenger determination unit 212 and the travel determination unit 213 indicate the unmanned traveling condition of the self-driving vehicle, the light blocking control unit 214 adjusts the solar radiation into the vehicle cabin from the window of the self-driving vehicle, by operating the light blocking device in the light blocking air conditioning control that performs the air conditioning in the vehicle interior. The light blocking control unit 214 performs the light blocking air conditioning control to reduce the opening degree of the light blocking device, thereby solar radiation is incident into the cabin of the self-driving vehicle. The light blocking control unit 214 performs the light blocking air conditioning control to increase the opening degree of the light blocking device, thereby solar radiation is incident into the cabin of the self-driving vehicle. The light blocking control unit 214 adjusts the opening degree of the light blocking device by performing the light blocking air conditioning control. Thus, the solar radiation into the vehicle cabin from the window of the self-driving vehicle is adjusted.

In the present embodiment, the light blocking control unit 214 can operate the light blocking device individually corresponding to each of the windows provided in the self-driving vehicle.

The window operation control unit 215 outputs a window operation signal that instructs the window actuator 31 to open or close the window. The window actuator 31 drives the window to open or close in the self-driving vehicle.

The solar radiation detection unit 216 detects solar radiation information indicating whether there is solar radiation to such an extent to change the temperature in the vehicle cabin of the self-driving vehicle, based on the solar radiation amount data. For example, when the amount of solar radiation is equal to or greater than a predetermined threshold value, the solar radiation detection unit 216 detects solar radiation information indicating that there is solar radiation to such an extent to change the temperature in the vehicle cabin. The solar radiation detection unit 216 also detects, based on the solar radiation amount data, that the solar radiation into the vehicle cabin of the self-driving vehicle is in a biased solar radiation state in which the solar radiation is biased. As an example, in the present embodiment, the solar radiation sensor 41 detects the biased solar radiation state for each window. The solar radiation detection unit 216 is provided to correspond to all the windows provided in the self-driving vehicle. One solar radiation detection unit 216 may be provided for each window. The light blocking control unit 214 executes the light blocking air conditioning control by selecting a light blocking device corresponding to the window into which the solar radiation is incident according to the biased solar radiation state detected by the solar radiation detection unit 216.

The inside temperature detection unit 217 detects a vehicle interior temperature Tin of the self-driving vehicle based on the inside temperature data. The inside temperature detection unit 217 may be, for example, a thermistor or an IR sensor. In the present embodiment, the inside temperature detection unit 217 can detect the inside temperature for each seat of the self-driving vehicle based on the inside temperature data output from each inside temperature sensor 44.

The outside temperature detection unit 218 detects the outside temperature of the self-driving vehicle based on the outside temperature data.

In the present embodiment, the light blocking control unit 214 operates the light blocking device to block the solar radiation into the vehicle cabin of the self-driving vehicle when the vehicle interior temperature Tin is higher than the appropriate temperature range. As an example, when there is a seat whose temperature is higher than the appropriate temperature range, the light blocking control unit 214 executes the light blocking air conditioning control by operating the light blocking device to block the solar radiation into the seat.

When the temperature in the cabin is lower than the appropriate temperature range, the light blocking control unit 214 executes the light blocking air conditioning control by operating the light blocking device to make the solar radiation incident into the cabin of the self-driving vehicle. As an example, when there is a seat at a temperature lower than the appropriate temperature range, the light blocking control unit 214 executes the light blocking air conditioning control by operating the light blocking device to make the solar radiation incident into the seat.

As described above, in the present embodiment, the light blocking control unit 214 determines the execution content of the light blocking air conditioning control based on the detection result of the solar radiation detection unit 216 and the detection result of the insider temperature detection unit 217.

The remaining travel calculation unit 219 calculates a scheduled travel time of unmanned travel before a person gets on the self-driving vehicle based on the position information. The remaining travel calculation unit 219 calculates the scheduled travel time based on the current position of the self-driving vehicle and the destination position where a person is to get on.

As described above, the air conditioning control ECU 21 according to the present embodiment includes the passenger determination unit 212 that determines the passenger state on the self-driving vehicle, and the travel determination unit 213 that determines the traveling state of the self-driving vehicle. The air conditioning control ECU 21 further includes the light blocking control unit 214 that executes the light blocking air conditioning control when the determination results of the passenger determination unit 212 and the travel determination unit 213 indicate the unmanned traveling state of the self-driving vehicle. As described above, the light blocking air conditioning control performs the air conditioning for the vehicle interior by operating the light blocking device to adjust the solar radiation into the vehicle cabin from the window of the self-driving vehicle.

According to the present embodiment, when it is determined that the vehicle is in the unmanned traveling state, the light blocking air conditioning control is executed to condition air in the vehicle interior by operating the light blocking device to adjust the solar radiation into the vehicle cabin. Therefore, it is possible to adjust the solar radiation into the vehicle cabin and to make the temperature in the vehicle cabin more comfortable without relying only on the air conditioner 25 using the refrigeration cycle. Furthermore, the load on the air conditioner 25 can be reduced when a person gets on the unmanned vehicle and operates the air conditioner 25 using a refrigeration cycle, since the operation can be started at or near the appropriate temperature.

The air conditioning control ECU 21 according to the present embodiment further includes the solar radiation detection unit 216 that detects solar radiation into the cabin of the self-driving vehicle. The light blocking control unit 214 determines the execution content of the light blocking air conditioning control based on the detection result of the solar radiation detection unit 216.

According to the present embodiment, it is possible to determine whether or not the solar radiation should be blocked according to the actual solar radiation situation, since the solar radiation into the vehicle cabin is detected. Thus, the solar radiation into the vehicle cabin can be more accurately adjusted.

In the present embodiment, the solar radiation detection unit 216 can detect a biased solar radiation state that the solar radiation into the vehicle cabin of the self-driving vehicle is biased. The light blocking control unit 214 can operate the light blocking device individually corresponding to each of the windows in the self-driving vehicle, and executes the light blocking air conditioning control by selecting the light blocking device corresponding to window into which the solar radiation is incident based on the biased solar radiation state detected by the solar radiation detection unit 216.

According to the present embodiment, since the light blocking device is selected corresponding to the window into which the solar radiation is incident in the light blocking air conditioning control according to the biased solar radiation state, it is possible to adjust the solar radiation into the vehicle cabin more accurately by determining whether to block the solar radiation by operating the light blocking device for each window.

The air conditioning control ECU 21 according to the present embodiment further includes the inside temperature detection unit 217 that detects a cabin temperature of the self-driving vehicle. The light blocking control unit 214 determines the execution content of the light blocking air conditioning control based on the detection result of the solar radiation detection unit 216 and the detection result of the inside temperature detection unit 217.

According to the present embodiment, the light blocking air conditioning control is executed in view of the cabin temperature. The cabin temperature rises when the solar radiation is incident into the vehicle cabin. The cabin temperature decreases when the solar radiation is blocked so as not to be incident into the vehicle cabin. Thus, it is possible to more accurately determine whether or not to block the solar radiation by operating the light blocking device.

In the present embodiment, the light blocking control unit 214 operates the light blocking device to block the sunlight into the cabin of the self-driving vehicle when the temperature in the cabin is higher than the appropriate temperature range. When the cabin temperature is lower than the appropriate temperature range, the light blocking air conditioning control is performed to operate the light blocking device to make the solar radiation incident into the cabin of the self-driving vehicle.

According to the present embodiment, when the temperature in the vehicle cabin is high, it is possible to lower the temperature in the vehicle cabin by shutting off the solar radiation to approach the appropriate temperature range. When the temperature in the vehicle cabin is low, the temperature can be raised by the solar radiation to approach the proper temperature range.

In the present embodiment, the light blocking control unit 214 operates the light blocking device to suppress the solar radiation into the cabin of the self-driving vehicle when the temperature in the cabin is higher than a solar radiation introduction threshold. In the light blocking air conditioning control, the light blocking device is operated to increase the amount of solar radiation into the vehicle cabin of the self-driving vehicle when the temperature in the cabin is lower than the solar radiation introduction threshold. After the operation of the light blocking device, the solar radiation introduction threshold is adjusted to maintain the solar radiation adjustment state of the light blocking device.

Even after the light blocking device is operated, the temperature in the cabin may fluctuate in a short time due to the fluctuation of the solar radiation state. Then, after operating the light blocking device, the solar radiation introduction threshold is adjusted to maintain the solar radiation adjustment state of the light blocking device, so as to restrict the light blocking device.

In the present embodiment, the solar radiation detection unit 216 can detect a biased solar radiation state that the solar radiation into the vehicle cabin of the self-driving vehicle is biased. The inside temperature detection unit 217 can detect the inside temperature for each seat of the self-driving vehicle. When there is a seat whose temperature is higher than the appropriate temperature range, the light blocking control unit 214 operates the light blocking device to block the solar radiation into the seat. When there is a seat whose temperature is lower than the appropriate temperature range, the light blocking air conditioning control is performed to operate the light blocking device so that the solar radiation enters the seat.

The incident direction of sunlight into the cabin of the self-driving vehicle is often a direction toward the sun. The incident direction of sunlight changes in consideration of the fact that the self-driving vehicle is moving on the road, so that the sunlight is incident into the vehicle cabin in one direction as so-called biased solar radiation state. Therefore, according to the present embodiment, in response to the biased solar radiation state in which the solar radiation incident into the vehicle cabin is biased in one direction, the solar radiation into the seat is blocked to suppress the temperature rise, or the solar radiation into the seat is facilitated to raise the temperature, such that it is possible to more accurately execute the light blocking air conditioning control.

The air conditioning control ECU 21 according to the present embodiment further includes the air conditioning control unit 211 that controls the air conditioner 25 capable of performing air conditioning in the vehicle cabin with conditioned air adjusted in temperature by the refrigeration cycle in the self-driving vehicle. The air conditioning control ECU 21 further includes the remaining travel calculation unit 219 that calculates the scheduled travel time of unmanned travel before a person gets on the self-driving vehicle. The air-conditioning control unit 211 executes the air conditioning by operating the refrigeration cycle when the time needed for making the temperature in the cabin of the self-driving vehicle within the appropriate temperature range using the air conditioner 25 is less than or equal to the scheduled travel time.

According to the present embodiment, when the time needed for making the temperature in the cabin of the self-driving vehicle within the appropriate temperature range using the air conditioner 25 is less than or equal to the scheduled travel time, the air conditioning is performed for the vehicle interior by operating the refrigeration cycle. Therefore, the cabin can be kept within the proper temperature range when a person gets on the vehicle. Even in this case, since the light blocking air conditioning control is performed in advance, the temperature in the cabin can be made as close as possible to the appropriate temperature range. Therefore, the electricity efficiency and the fuel efficiency can be improved as compared with the case where the light blocking air conditioning control is not used.

In the present embodiment, the air conditioning control unit 211 conducts the cabin air conditioning by using the refrigeration cycle only for the seat where the time needed for making the temperature in the cabin of the self-driving vehicle within the appropriate temperature range using the air conditioner 25 is less than or equal to the scheduled travel time.

According to the present embodiment, the cabin air conditioning is performed by using the refrigeration cycle only for the seat where the time needed for making the temperature in the cabin of the self-driving vehicle within the appropriate temperature range using the air conditioner 25 is less than or equal to the scheduled travel time. This makes it possible to minimize the execution of air conditioning for the cabin using the refrigeration cycle so as to improve the electricity efficiency and the fuel efficiency.

Subsequently, the control operation of the air conditioning control ECU 21 will be described with reference to FIGS. 2, 3 and 4.

Figure 2:
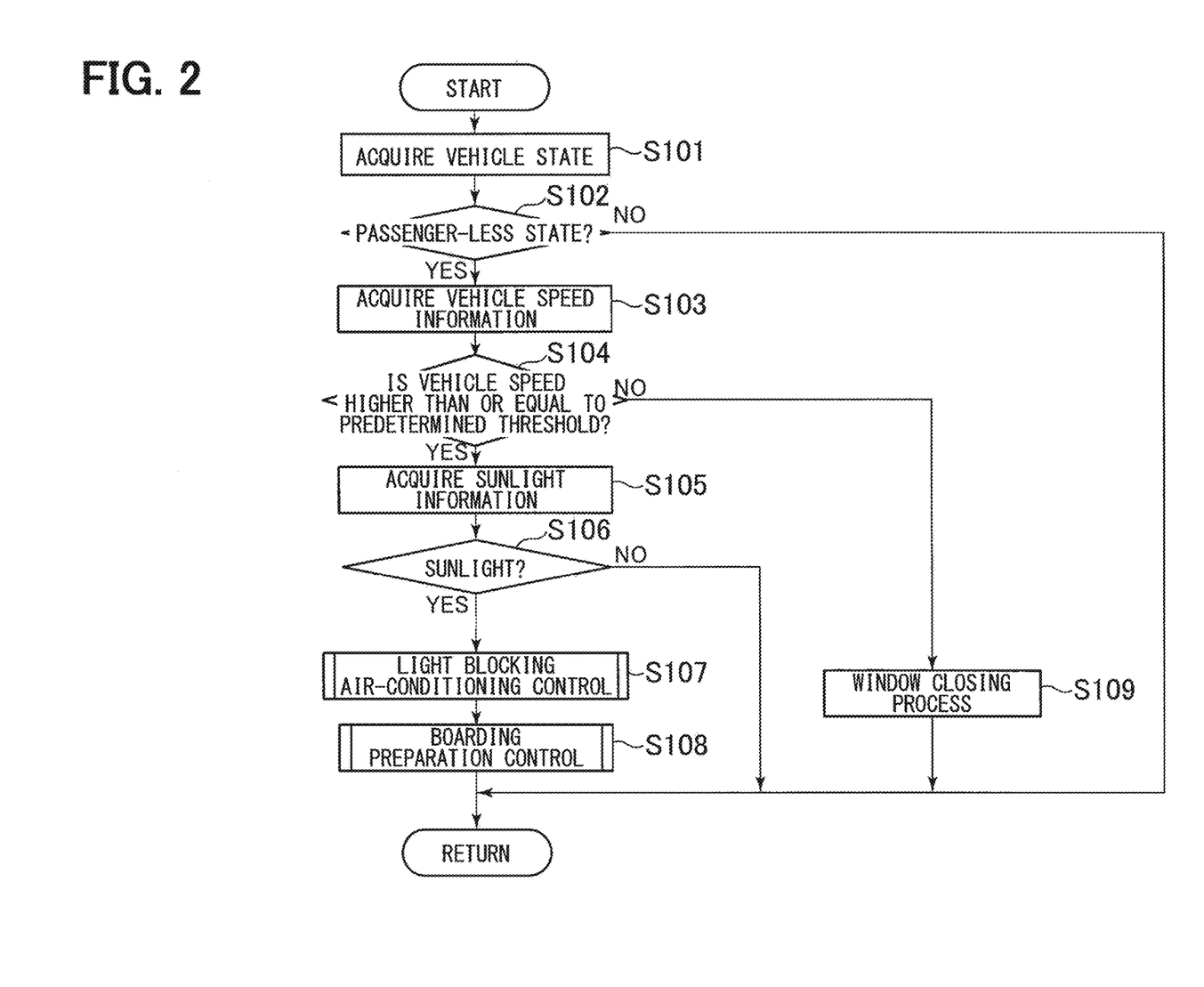
FIG. 2 is a flowchart explaining processing of the air conditioning control ECU of the present embodiment.

In step S101 of FIG. 2, the passenger determination unit 212 acquires the vehicle state. In step S102 subsequent to step S101, the passenger determination unit 212 determines whether the self-driving vehicle is in a passenger-less state. When the self-driving vehicle is in the passenger-less state, the process proceeds to step S103. When the self-driving vehicle is not in the passenger-less state, the process returns.

In step S103, the travel determination unit 213 acquires the vehicle speed information. In step S104 following step S103, the travel determination unit 213 determines whether the vehicle speed is equal to or greater than a predetermined threshold speed. When the vehicle speed is equal to or higher than a predetermined threshold speed, it is determined that the vehicle is in an unmanned travelling state, and the process proceeds to step S105. When the vehicle speed is not equal to or higher than the predetermined threshold speed, it is determined that the vehicle is not in the unmanned traveling state, and the process proceeds to step S109. In step S109, when the window is opened, the window closing process is executed for closing the window, and the process returns.

In step S105, the solar radiation detection unit 216 acquires the solar radiation information. In step S106 following step S105, the light blocking control unit 214 determines, based on the solar radiation information, whether there is solar radiation to such an extent as to change the temperature in the cabin of the self-driving vehicle. When there is solar radiation to such an extent as to change the temperature in the cabin, it is determined that the light blocking air conditioning control needs to be executed, and the process proceeds to step S107. When there is no such solar radiation, it is determined that it is not necessary to execute the light blocking air conditioning control, and the process returns.

In step S107, the light blocking control unit 214 executes the light blocking air conditioning control. The light blocking air conditioning control will be described with reference to FIG. 3.

Figure 3:
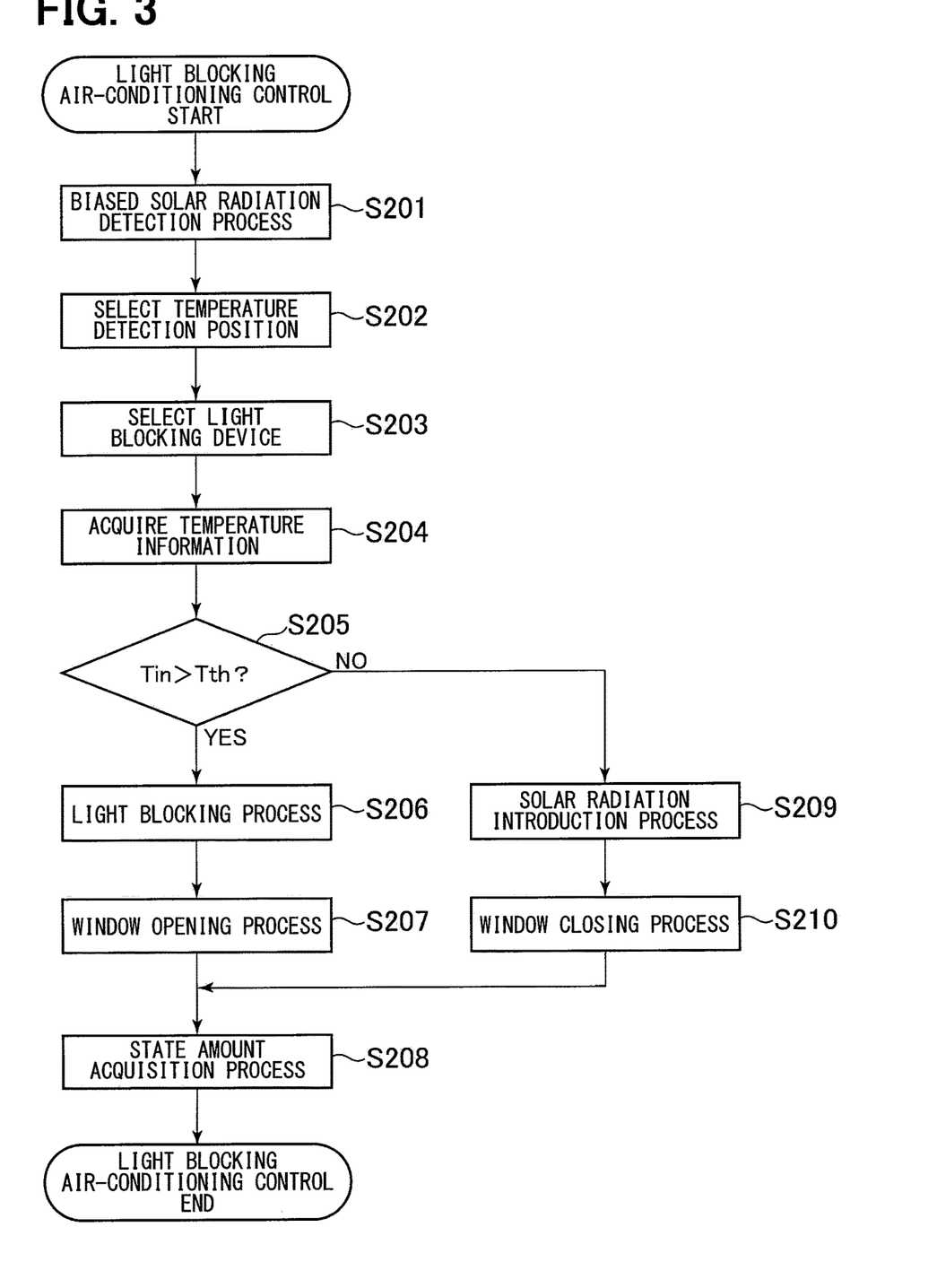
FIG. 3 is a flowchart explaining processing of the air conditioning control ECU of the present embodiment.

In step S201 of FIG. 3, the solar radiation detection unit 216 executes a process of detecting a biased solar radiation state that the solar radiation into the vehicle cabin of the self-driving vehicle is biased. As described above, the solar radiation sensor 41 detects the biased solar radiation state for each window in the self-driving vehicle.

In step S202 following step S201, the light blocking control unit 214 selects one or more windows to be subjected to temperature detection, among the plural windows in the self-driving vehicle, based on the contents of the biased solar radiation state. In other words, the light blocking control unit 214 selects one or more inside temperature sensors 44 to be subjected to temperature detection, among the plural inside temperature sensors 44 provided corresponding to the windows. The light blocking control unit 214 selects the window, for example, having a relatively large amount of solar radiation, among the windows.

In step S203 following step S202, the light blocking control unit 214 selects the light blocking device corresponding to the window subjected to temperature detection in step S202.

In step S204 subsequent to step S203, the inside temperature detection unit 217 acquires temperature information. As described above, the inside temperature detection unit 217 detects the interior temperature Tin for each seat of the self-driving vehicle.

In step S205 following step S204, the light blocking control unit 214 determines whether the interior temperature Tin is higher than the appropriate temperature range. In other words, the light blocking control unit 214 determines whether the interior temperature Tin is higher than the solar radiation introduction threshold Tth. When the interior temperature Tin is higher than the solar radiation introduction threshold Tth, it is determined that a light blocking process is required to operate the light blocking device to block the solar radiation into the vehicle cabin of the self-driving vehicle, and the process proceeds to step S206. When the interior temperature Tin is equal to or lower than the solar radiation introduction threshold Tth, it is determined that the light blocking process is unnecessary, and the solar radiation introduction process is necessary and operates the light blocking device to make the solar radiation incident into the vehicle cabin of the self-driving vehicle. Then, the process proceeds to step S209.

It is preferable to give a margin of several degrees to the solar radiation introduction threshold Tth when the next light blocking air conditioning control starts, for example, after the interior temperature Tin exceeds the solar radiation introduction threshold Tth when the flow of the light blocking air conditioning control is first processed, so that so-called hunting is not caused by reverse in the determination. For example, when the initial solar radiation introduction threshold Tth is 25° C., the determination of step S205 can be made by setting the solar radiation introduction threshold Tth to 23° C. when entering the next flow of the light blocking air conditioning control. If the initial solar radiation introduction threshold Tth is 25° C. and the initial interior temperature Tin is 26° C., the process proceeds to step S206, but the interior temperature Tin may be lowered to 24° C. at the next determination by fluctuations in the cabin temperature due to fluctuations in the solar radiation. If the determination in step S205 is reversed in such a situation, the light blocking and the solar radiation introduction will be repeated in a short cycle. Therefore, it is preferable to set the solar radiation introduction threshold Tth to allow temperature fluctuations in a short period of time.

In case where the interior temperature Tin is lower than the solar radiation introduction threshold Tth when the flow of the light blocking air conditioning control is processed first, it is preferable to give a width of several degrees to the solar radiation introduction threshold Tth when entering the next flow of the light blocking air conditioning control. For example, in case where the initial solar radiation introduction threshold Tth is 25° C., the determination in step S205 may be made with the solar radiation introduction threshold Tth of 27° C. when entering the next flow of the light blocking air conditioning control. If the initial solar radiation introduction threshold Tth is 25° C. and the initial interior temperature Tin is 24° C., the process proceeds to step S206, but the interior temperature Tin may rise to 26° C. at the time of the next determination due to fluctuations in the cabin temperature caused by fluctuations in the solar radiation. If the determination in step S205 is reversed in such a situation, the light blocking and the solar radiation introduction will be repeated in a short cycle. Therefore, it is preferable to set the solar radiation introduction threshold Tth to allow temperature fluctuations in a short period of time.

As described above, by providing a variation margin of plus and minus several degrees with respect to the solar radiation introduction threshold Tth, the temperature in the cabin can be controlled within the appropriate temperature range between 23° C. and 27° C., when setting the target vehicle interior temperature, for example, as 25° C.

In step S206, the light blocking control unit 214 executes a light blocking process to operate the light blocking device so as to shield the sunlight into the vehicle cabin of the self-driving vehicle. The light blocking control unit 214 executes processing to reduce the opening degree of the light blocking device. When there is a seat having a temperature higher than the appropriate temperature range, the light blocking control unit 214 operates the light blocking device corresponding to the window so as to block the solar radiation into the vehicle cabin from the window corresponding to the seat.

In step S207 following step S206, if the window is closed, the window operation control unit 215 executes window opening processing to open the window. When executing the window opening process, the window operation control unit 215 may drive the blower 251 to promote the air circulation in the vehicle interior and to promote the replacement of air between inside and outside the vehicle interior.

In step S209, the light blocking control unit 214 executes a solar radiation introduction process by operating the light blocking device so as to make the solar light incident into the cabin of the self-driving vehicle. The light blocking control unit 214 executes processing to increase the opening degree of the light blocking device. When there is a seat whose temperature is lower than the appropriate temperature range, the light blocking control unit 214 operates the light blocking device corresponding to the window so that the solar radiation is incident from the window corresponding to the seat. The light blocking control unit 214 executes the light blocking air conditioning control by selecting a light blocking device corresponding to the window into which the solar radiation is incident according to the biased solar radiation state detected by the solar radiation detection unit 216.

In step S210 following step S209, if the window is open, the window operation control unit 215 executes window closing processing for closing the window.

In step S208 following step S207 and step S210, the light blocking control unit 214 acquires the open/close state of the light blocking device as a state amount, executes processing for storing the state amount in the memory, and ends the light blocking air conditioning control. At this time, the window operation control unit 215 acquires the open/close state of the window as a state amount, and executes a process of storing the state amount in the memory.

Returning to FIG. 2, in step S108 following step S107, a boarding preparation control is executed. The process returns after the boarding preparation control is executed. The boarding preparation control will be described with reference to FIG. 4.

Figure 4:
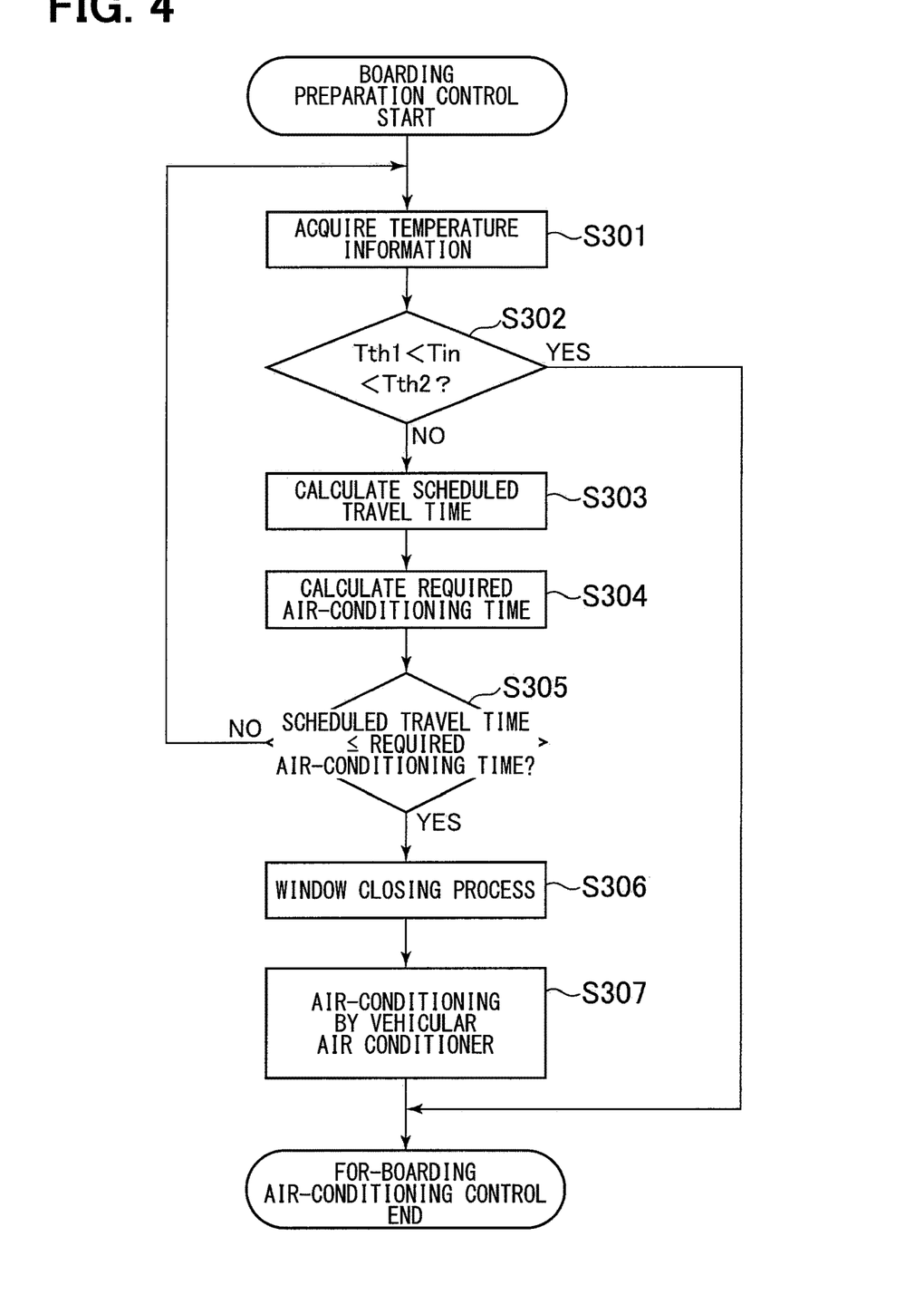
FIG. 4 is a flowchart explaining processing of the air conditioning control ECU of the present embodiment.

In step S301 in FIG. 4, the inside temperature detection unit 217 acquires the vehicle interior temperature Tin, and the outside temperature detection unit 218 acquires the vehicle exterior temperature Tout.

In step S302 following step S301, the light blocking control unit 214 determines whether the vehicle interior temperature Tin is within the appropriate temperature range. More specifically, it is determined whether the vehicle interior temperature Tin is higher than the appropriate temperature lower limit threshold Tth1 and lower than the appropriate temperature upper limit threshold Tth2. Assuming that the appropriate temperature range is from 22° C. to 28° C., the appropriate temperature lower limit threshold Tth1 is 22° C., and the appropriate temperature upper limit threshold Tth2 is 28° C. When the vehicle interior temperature Tin falls within the appropriate temperature range, the boarding preparation control is ended. When the vehicle interior temperature Tin does not fall within the appropriate temperature range, the process proceeds to step S303.

In step S303, the remaining travel calculation unit 219 acquires a scheduled travel time. The scheduled travel time can be obtained based on the current position of the self-driving vehicle and the position where a person is going to board, in consideration of surrounding road conditions, the traveling speed of the self-driving vehicle, and the like.

In step S304 following step S303, the air conditioning control unit 211 calculates a required air conditioning time to make the vehicle interior temperature Tin within the appropriate temperature range by the air conditioner 25 using the refrigeration cycle including the blower 251 and the compressor 252.

In step S305 following step S304, the light blocking control unit 214 determines whether the scheduled travel time is equal to or less than the required air conditioning time. When the scheduled travel time is equal to or less than the required air conditioning time, the process proceeds to step S306. When the scheduled travel time is not equal to or less than the required air conditioning time, the process returns to the process of step S301.

In step S306, the window operation control unit 215 executes window closing processing to close the window. In step S307 subsequent to step S306, the air conditioning control unit 211 executes air conditioning by the vehicular air conditioner 25 using the refrigeration cycle including the blower 251 and the compressor 252.

Figure 5:
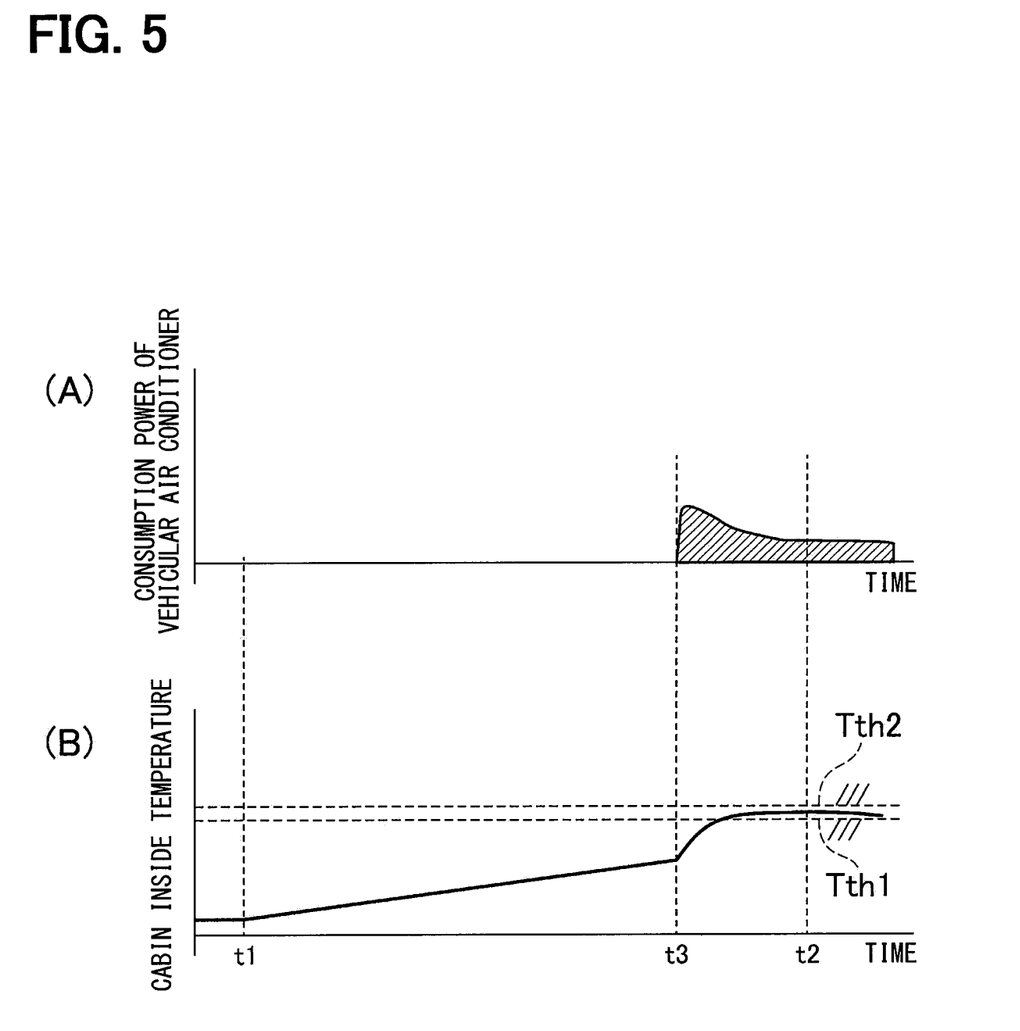
FIG. 5 is a diagram describing a state in which power consumption is suppressed by control by the air conditioning control ECU according to the present embodiment.

When the light blocking air conditioning control is executed, the temperature in the cabin changes to fall within the appropriate temperature range until the self-driving vehicle moves to a place where a person gets on. An example of the temperature change in the cabin will be described with reference to FIG. 5. (A) of FIG. 5 shows the power consumption of the air conditioner 25, and (B) of FIG. 5 shows the cabin inside temperature.

At time t1, the light blocking air conditioning control is started by operating the light blocking device to make the solar radiation incident, and the light blocking air conditioning control is continued until a person gets in at time t2. The cabin temperature gradually rises from time t1 and approaches the appropriate temperature lower limit threshold Tth1 at time t3 before time t2. At time t3, the air conditioner 25 using the refrigeration cycle starts the air conditioning. Therefore, the temperature rise in the cabin increases from time t3, and the power consumption of the air conditioner 25 increases from time t3. When a person gets on at time t2, the temperature reaches the appropriate temperature lower limit threshold Tth1. Since the air conditioner 25 operates after the vehicle interior temperature approaches the appropriate temperature range, the power consumption of the air conditioner 25 is reduced as compared to the case where the vehicle interior temperature is low.

Figure 6:
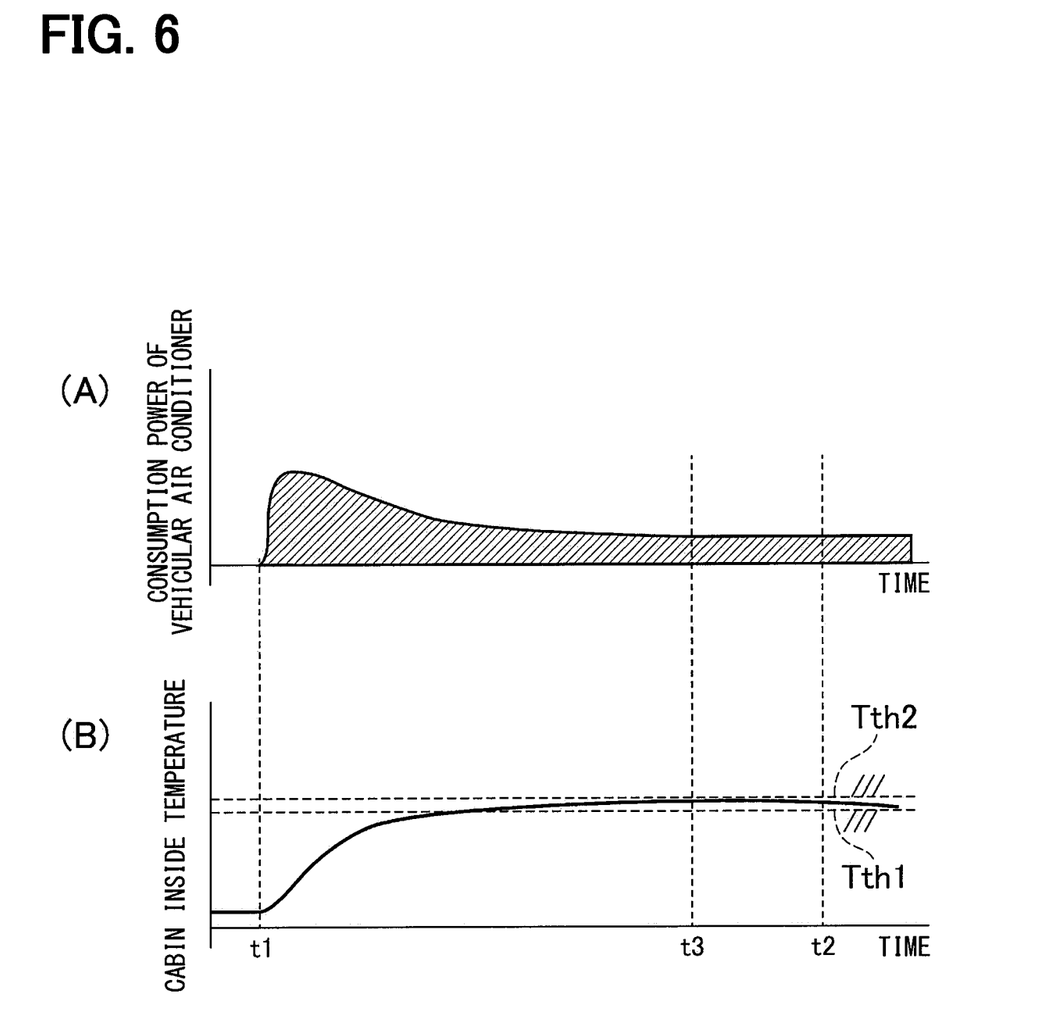
FIG. 6 is a diagram describing power consumption when the air conditioning control ECU of the present embodiment is not used.

For comparison, an example of temperature change in the cabin and the power consumption of the air conditioner 25 when the light blocking air conditioning control is not performed will be described with reference to FIG. 6. (A) of FIG. 6 shows the power consumption of the air conditioner 25, and (B) of FIG. 6 shows the cabin inside temperature.

At time t1, the air conditioning control using the air conditioner 25 is started, and is continued until a person gets on the vehicle at time t2. Compared to the light blocking air conditioning control, the temperature rise in the cabin increases from time t1, and the temperature reaches the appropriate temperature lower limit threshold Tth1 at time t3 before time t2. Since the air conditioner 25 is operated in a low temperature state, the load is increased, and the power consumption of the air conditioner 25 is larger compared to the case described with reference to FIG. 5.

In the present embodiment, the air conditioning control ECU 21 includes, as functional components, the air conditioning control unit 211, the passenger determination unit 212, the travel determination unit 213, the light blocking control unit 214, the window operation control unit 215, the solar radiation detection unit 216, the inside temperature detection unit 217, the outside temperature detection unit 218, and the remaining travel calculation unit 219. However, it is not necessary that all the functional components be provided in the air conditioning control ECU 21. A part or all functional components may be provided in the vehicle control ECU 101 or another ECU, if it is possible to drive the light blocking device actuator 30, the window actuator 31, and the air conditioner 25 based on the above-described information processing.

In the embodiment, the light blocking control unit 214 determines the execution content of the light blocking air conditioning control based on the detection result of the solar radiation detection unit 216 and the detection result of the inside temperature detection unit 217. However, the light blocking control unit 214 may determine the execution content of the light blocking air conditioning control only on the basis of the detection result of the solar radiation detection unit 216, among the detection result of the solar radiation detection unit 216 and the detection result of the inside temperature detection unit 217.

Further, the control of the air conditioning control ECU 21 described with reference to FIGS. 2, 3 and 4 may be executed only when it is confirmed that the self-driving vehicle is operating.

The correspondence between the present embodiment described above and the present disclosure will be described. The air conditioning control ECU 21 of the present embodiment corresponds to the air conditioning control device of the present disclosure.

The present embodiment has been described above with reference to concrete examples. However, the present disclosure is not limited to those specific examples. Those specific examples that are appropriately modified in design by those skilled in the art are also encompassed in the scope of the present disclosure, as far as the modified specific examples have the features of the present disclosure. Each element included in each of the specific examples described above and the arrangement, condition, shape, and the like thereof are not limited to those illustrated, and can be changed as appropriate. The combinations of elements included in each of the above described specific examples can be appropriately modified as long as no technical inconsistency occurs.

What is claimed is:

1. An air conditioning control device for a self-driving vehicle comprising:
a passenger determination unit that determines whether a passenger is in the self-driving vehicle;
a travel determination unit that determines a traveling state of the self-driving vehicle; and
a light blocking control unit that executes a light blocking air conditioning control for a vehicle cabin by operating a light blocking device to adjust solar radiation into the vehicle cabin from a window of the self-driving vehicle when the passenger determination unit and the travel determination unit determine that the self-driving vehicle is in an unmanned traveling condition, the light blocking control unit execution of the light blocking air conditioning control has priority over an air conditioning unit until a scheduled travel time is shorter than or equal to a time period for making the temperature in the vehicle cabin within a proper temperature range.

2. The air conditioning control device according to claim 1, further comprising:
a solar radiation detection unit configured to detect solar radiation into the vehicle cabin of the self-driving vehicle, wherein
the light blocking control unit determines an activation of the light blocking air conditioning control based on a detection result of the solar radiation detection unit.

3. The air conditioning control device according to claim 2, wherein
the solar radiation detection unit is able to detect a solar radiation amount in the vehicle cabin of the self-driving vehicle, and
the light blocking control unit is able to operate the light blocking device individually corresponding to a plurality of windows of the self-driving vehicle, and executes the light blocking air conditioning control by selecting the light blocking device corresponding to the window into which the solar radiation is incident depending on the solar radiation amount detected by the solar radiation detection unit.

4. The air conditioning control device according to claim 2, further comprising:
an inside temperature detection unit configured to detect a temperature inside the vehicle cabin of the self-driving vehicle, wherein
the light blocking control unit determines an execution content of the light blocking air conditioning control based on a detection result of the solar radiation detection unit and a detection result of the inside temperature detection unit.

5. The air conditioning control device according to claim 4, wherein
the light blocking control unit operates the light blocking device to suppress solar radiation into the vehicle cabin of the self-driving vehicle when the temperature in the vehicle cabin is higher than a proper temperature range, and
the light blocking control unit operates the light blocking device to increase solar radiation into the vehicle cabin of the self-driving vehicle when the temperature in the vehicle cabin is lower than the proper temperature range.

6. The air conditioning control device according to claim 5, wherein
the light blocking control unit operates the light blocking device to suppress solar radiation into the vehicle cabin of the self-driving vehicle when the temperature in the vehicle cabin is higher than a solar radiation introduction threshold, and operates the light blocking device to increase the solar radiation into the vehicle cabin of the self-driving vehicle when the temperature in the vehicle cabin is lower than the solar radiation introduction threshold, and
the light blocking control unit adjusts the solar radiation introduction threshold to maintain a solar radiation adjustment state of the light blocking device after the light blocking device is operated.

7. The air conditioning control device according to claim 5, wherein
the solar radiation detection unit is able to detect a solar radiation amount in the vehicle cabin of the self-driving vehicle,
the inside temperature detection unit is capable of detecting a temperature in the vehicle cabin for each seat of the self-driving vehicle,
when the seat has a temperature higher than a proper temperature range, the light blocking control unit operates the light blocking device to suppress solar radiation into the seat, and
when the seat has a temperature lower than the proper temperature range, the light blocking control unit operates the light blocking device to increase the solar radiation into the seat.

8. The air conditioning control device according to claim 1, further comprising:
an air conditioning control unit configured to control a vehicular air-conditioner capable of performing air conditioning in the vehicle cabin with air cooled by the refrigeration cycle mounted on the self-driving vehicle; and
a remaining travel calculation unit configured to calculate a scheduled traveling time of unmanned traveling before a person gets on the self-driving vehicle, wherein
the air conditioning control unit executes air conditioning in the vehicle cabin by operating the refrigeration cycle, when it is determined that the scheduled travel time is shorter than or equal to the time period for making the temperature in the vehicle cabin within the proper temperature range using the air conditioner.

9. The air conditioning control device according to claim 8, wherein
the air conditioning control unit operates the refrigeration cycle only for a seat where it is determined that the scheduled travel time is shorter than or equal to the time period for making the temperature in the vehicle cabin within the proper temperature range using the air conditioner.

* * * * *